United States Patent [19]

Goodman et al.

[11] Patent Number: 4,533,465
[45] Date of Patent: * Aug. 6, 1985

[54] LOW MOLECULAR WEIGHT COPOLYMERS AS DEPRESSANTS IN SYLVINITE ORE FLOTATION

[75] Inventors: Richard M. Goodman, Norwalk; Sim K. Lim, Stamford, both of Conn.

[73] Assignee: American Cyanamid Company, Stamford, Conn.

[*] Notice: The portion of the term of this patent subsequent to Sep. 15, 1998 has been disclaimed.

[21] Appl. No.: 631,009

[22] Filed: Jul. 16, 1984

Related U.S. Application Data

[63] Continuation of Ser. No. 372,259, Apr. 26, 1982, abandoned, which is a continuation-in-part of Ser. No. 246,521, Mar. 23, 1981, abandoned, which is a continuation-in-part of Ser. No. 95,812, Nov. 19, 1979, Pat. No. 4,289,613.

[51] Int. Cl.$^3$ .............................................. B03D 1/14
[52] U.S. Cl. ..................................................... 209/167
[58] Field of Search ......................................... 209/167

[56] References Cited

U.S. PATENT DOCUMENTS

| | | |
|---|---|---|
| 2,696,912 | 12/1954 | Atwood et al. . |
| 2,952,358 | 9/1960 | Schoeld . |
| 3,095,282 | 6/1963 | Wilson .................................. 209/5 |
| 3,572,504 | 3/1971 | De Cuyper . |
| 3,658,771 | 4/1972 | Volk et al. . |
| 3,717,574 | 2/1973 | Werneke . |
| 3,805,951 | 4/1974 | Brogoitti et al. . |
| 3,929,629 | 12/1975 | Griffith . |
| 4,090,955 | 5/1978 | Dexter et al. . |
| 4,192,737 | 3/1980 | Thompson et al. . |
| 4,289,613 | 9/1981 | Goodman et al. . |
| 4,360,425 | 11/1982 | Lim et al. . |

FOREIGN PATENT DOCUMENTS 20275  12/1980  European Pat. Off. .

*Primary Examiner*—Bernard Nozick
*Attorney, Agent, or Firm*—John W. Cornell

[57] ABSTRACT

Low molecular weight copolymers of the general formula:

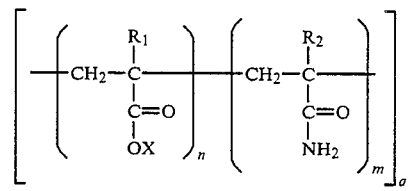

exhibit excellent concentrative action in the flotation of sylvinite ores thereby resulting in improved selectivity and recovery of sylvite (KCl). The low molecular weight copolymers perform concentrative action without resulting in any associated flocculation in the flotation process.

8 Claims, No Drawings

LOW MOLECULAR WEIGHT COPOLYMERS AS DEPRESSANTS IN SYLVINITE ORE FLOTATION

RELATION TO PRIOR APPLICATIONS

This application is a continuation of application Ser. No. 372,259, filed Apr. 26, 1982, abandoned, which is in turn a continuation-in-part of application Ser. No. 246,521 filed Mar. 23, 1981 now abandoned, which is a continuation-in-part of application Ser. No. 095,812, filed Nov. 19, 1979 now U.S. Pat. No. 4,289,613.

BACKGROUND OF THE INVENTION

In mineral ore flotation, depression comprises steps taken to prevent the flotation of a particular mineral. In one mineral flotation systems, it is commonly practiced to hold down both the gangue materials and low-assay middlings. In differential flotation systems, it is used to hold back one or more of the materials normally floatable by a given collector.

Depression is conventionally accomplished through the use of reagents known as depressing agents, or more commonly, depressants. When added to the flotation systems, the depressing agents exert a specific action upon the material to be depressed thereby preventing that material from floating. The exact mode of this action remains open to speculation. Various theories have been put forth to explain this action; some of which include: that the depressants react chemically with the mineral surface to produce insoluble protective films of a wettable nature which fail to react with collectors; that the depressants, by various physical-chemical mechanisms, such as surface adsorption, mass-action effects, complex formation, or the like, prevent the formation of the collector film; that the depressants act as solvents for an activating film naturally associated with the mineral; that the depressants act as solvents for the collecting film; and the like. These theories appear closely related and the correct theory may ultimately prove to involve elements from several, if not all, of them.

Sylvinite ores contain various amounts of KCl (sylvite) and NaCl (halite). Besides sylvite and halite, sylvinite ores also contain small amounts of water insoluble clay, which forms a slime that interferes with the separation of KCl from the ore. Flotation processes are widely used to beneficiate KCl from the sylvinite ores by floating the KCl from the NaCl. The ground ore is suspended in a saturated solution of the soluble constituents, which also contains insoluble clay. The addition of amine collector and frother to the ore slurry gives a froth containing predominantly KCl. However, in the presence of clay, the amine collector tends to be adsorbed by the clay particles and decreases the efficiency of the separation process. By using the depressant of this invention, a substantial improvement in KCl recovery was accomplished. While not wishing to be bound by any theory, it is believed that the depressant may hinder the adsorption of the amine collector on the clay particles by blocking or "blinding" them. If this is true, the entire amount of added collector may then be utilized for KCl recovery, resulting in the observed increased KCl recovery.

Currently, sylvinite ore flotation processes have utilized depressants derived from natural substances such as starches, dextrins, guar gums, carboxymethyl cellulose and the like. See U.S. Pat. No. 3,456,790 to Fash, U.S. Pat. No. 3,371,778 to Iwasaki, D.P. No. 919,703 and U.S. Pat. No. 2,364,520. However, from an ecological vantage point, the presence of residual depressants such as these in the waste waters may increase the biodegradable oxygen demand and the chemical oxygen demand, which, if of sufficient magnitude, might create a potential for pollution problem in the disposal of these waste waters. From a commercial vantage point, there are an ever-increasing number of countries in which use of reagents having a food value, such as starch, is prohibited in commercial applications. Furthermore, the starch-type depressants require a complex preparation of the reagent solution involving a cooking stage prior to solution and the resultant reagent is susceptible to bacterial decomposition thereby requiring storage monitoring.

Accordingly, there exists the need for a synthetic depressant which can at once overcome the drawbacks of the conventional depressants currently utilized and yet perform in an equivalent or superior manner.

Various depressants, also referred to as blinding agents, used in these flotation systems have been described in U.S. Pat. No. 3,452,867 to Bishop; U.S. Pat. No. 3,782,546 to Kirwin; U.S. Pat. No. 3,805,951 to Brogoitti; U.S. Pat. Nos. 2,288,497 and 2,364,520; and in German Offen No. 1,267,631 to Budan and Canadian Pat. No. 932,485 to Fee. Various other nonsulfide mineral ore depressants have been described in U.S. Pat. No. 3,572,504 to DeCuyper; U.S. Pat. No. 2,740,522 to Aimone and U.S. Pat. No. 3,929,629 to Griffith as well as in U.S.S.R. Pat. Nos. 130,428 to Gurvich and 141,826 to Livhits.

In all of the aforementioned references, the depressants disclosed are distinct in structure and properties than those employed in the instant process.

In our U.S. Pat. No. 4,289,613, the ultimate parent of this application, we disclose the use of synthetic depressant in the flotation of iron oxide and $SiO_2$. The froth consists mainly of $SiO_2$ (non value) whereas the underflow contains mostly iron oxide (value). In Example 22 of aforementioned patent we illustrated the nature of depressive action of synthetic depressant in the separation of sylvite from halite/clay. In contrast to the iron oxide/$SiO_2$ flotation, the froth consists here mostly of sylvite (value) while the underflow contains mainly halite/clay (non value); however, as was indicated in the example, the degree of separation was of the order of magnitude experienced in the iron oxide $SiO_2$ separation.

SUMMARY OF THE INVENTION

The present invention provides a process for concentrating KCl in a froth flotation system. The process comprises adding to the flotation system an effective amount of a synthetic depressant wherein said synthetic depressant is a low molecular weight copolymer or water soluble salt thereof of the general structure:

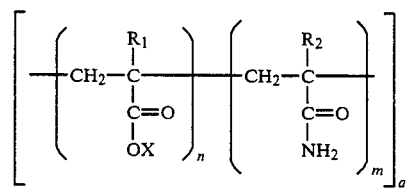

wherein $R_1$ and $R_2$ are individually hydrogen or a methyl radical, X is a hydrogen, alkali metal or ammonium ion, n and m are whole numbers such that the degree of hydrolysis is within the range from about 5 to 66% and n, m and a have numerical value such that the total molecular weight of the polymer or copolymer is within the range from about 500 to 85,000.

The process of the instant invention concentrates the KCl as well as comparable processes employing depressants such as starch at approximately one-sixth to one-fourth the dosage, calculated on active ingredient of depressant. The instant process, besides overcoming the deficiencies attributable to employing non-synthetic depressants as set forth earlier, does not result in flocculation of the beneficiated KCl.

DETAILED DESCRIPTION OF THE INVENTION

In accordance with the instant invention there is provided a process for concentrating KCl in a flotation system. The process comprises adding to the flotation system a synthetic depressant during the flotation stage. The synthetic depressant employed in this process is a low molecular weight copolymer of general structure I. The molecular weight of the synthetic depressant should be within the range from about 500 to 85,000 and preferably within the range from about 7,000 to 85,000. The degree of hydrolysis of the synethetic depressant should be from about 5% to 66%, preferably from about 20% to 55%, and more preferably, from about 40% to 45%. The hydrolyzed polyacrylamide can be prepared by first polymerizing acrylamide and then hydrolyzing some of the amide groups, or concurrent polymerization and hydrolysis or it may be made by other means, including copolymerization of acrylic acid or methacrylic acid and acrylamide, or hydrolysis of polyacrylonitrile, etc. In any event, there are the proper proportions of amide groups and the remainder being carboxyl groups, usually in the form of an alkali metal salt. The term hydrolyzed polyacrylamide is used as convenient understandable terminology rather than to limit the process of manufacture. Reagents which have been found particularly useful for hydrolysis include NaOH, KOH and NH$_4$OH.

The resulting low-molecular weight copolymer when employed as a depressant in the flotation system has exhibited improved selectivity and recovery over conventional depressants at substantially lower dosages of depressant. The synthetic depressant is easily diluted with water to provide a reagent solution that, due to its non-susceptibility to bacterial decomposition, can be stored almost indefinitely. The synthetic depressants should be added in an effective amount to obtain the desired degree of depression. Although this amount will vary depending upon the ore being processed, the flotation collector being employed, and other variables, it is generally on the order of about 0.01 to 0.20 pound of depressant calculated on active ingredient per long ton of ore. Additionally, the instant process is capable of employing a combination of synthetic depressant with a conventional, naturally derived depressant, such as starch, modified starch derivatives and guar gums to arrive at substantially equivalent or improved performance to that obtained when employing the conventional depressant alone.

The following specific examples illustrate certain aspects of the present invention and, more particularly, point out methods of evaluating the process for concentrating sylvite values in a flotation system. However, the examples are set forth for illustration only and are not to be construed as limitations on the present invention except as set forth in the appended claims. All parts and percentages are by weight unless otherwise specified.

Examples 1 to 23 illustrate the efficacy of the synthetic depressant at one-sixth to one-fourth dosage normally required for starch or guar to obtain equivalent or better grade, insolubles and recovery (Procedures I and II). The test results of Examples 24 and 25 following the Procedure III show that synthetic depressant at lower dose than carboxymethyl cellulose give equivalent and higher minerological performance.

EXPERIMENTAL PROCEDURE I

Step 1:
Scrub two separate samples each of 800 parts of sylvinite ore in 370 parts of a saturated brine solution for two minutes at 800 r.p.m. and thereafter combine the two samples into one containing at least 1600 parts of sylvinite ore.

Step 2:
Condition the sample of Step 1 in a flotation cell at 1400 r.p.m. with 20 parts of a 1.4% solution of nonionic polyacrylamide flocculant for 15 seconds and 2 parts of a 0.2% solution of cationic surfactant collector for 15 additional seconds.

Step 3:
Transfer the sample of Step 2 to a flotation bowl. Flotation is then conducted for two minutes at 1600 r.p.m. which results in a slime froth and underflow. The underflow portion is screened on a 20 mesh screen resulting in +20 mesh and −20 mesh fractions.

Step 4:
The +20 mesh portion of Step 3 is conditioned at 800 r.p.m. with 8 parts of a 4% starch solution for 15 seconds followed by 10 parts of a 2% solution of amine for 15 seconds and 4 drops of a hydrocarbon oil for 15 more seconds.

Step 5:
The −20 mesh portion of Step 3 is conditioned at 1100 r.p.m. with 8 parts of a 4% starch solution for 30 seconds followed by 5 parts of a 2% solution of amine for 30 seconds.

Step 6:
The +20 and −20 mesh portions are recombined in a flotation cell and conditioned at 1100 r.p.m. with 2 drops of a frother for 15 seconds. Flotation is conducted at 1400 r.p.m. for two minutes resulting in a concentrate and a tail.

COMPARATIVE EXAMPLE A

The Experimental Procedure set forth above is followed in every material detail employing as the depressant 0.52 pound of dry starch per long ton of sylvinite in the flotation steps. Test results are set forth in Table I.

EXAMPLE 1

The Experimental Procedure set forth above is followed in every material detail employing as the depressant 0.064 pound of a 45% hydrolyzed polyacrylamide having a molecular weight of 30,000 per long ton of sylvinite in place of the starch used during the flotation steps. Test results are set forth in Table I.

EXAMPLES 2-5

The Experimental Procedure set forth above is followed in every material detail employing 0.239 to 0.287 pound of dry copolymer depressant per long ton of sylvinite in place of the starch used during the flotation steps. Test results and details are set forth in Table I.

TABLE I
Evaluation of Synthetic Depressants

| Example | Reagents % COOH | MWt. | Dose Dry LB/LT | Assays Conc. KCl | Insol. | Distribution Conc. KCl |
|---|---|---|---|---|---|---|
| Comp. A | None | Starch | 0.520 | 87.6 | 2.8 | 72.7 |
| 1 | 45 | 30,000 | 0.064 | 87.8 | 2.7 | 70.7 |
| 2 | 43 | 7,000 | 0.287 | 91.4 | 2.2 | 68.4 |
| 3 | 66 | 7,000 | 0.287 | 88.3 | 3.2 | 68.5 |
| 4 | 45 | 2,500 | 0.239 | 89.0 | 4.4 | 54.9 |
| 5 | 23 | 7,000 | 0.285 | 86.4 | 3.0 | 71.7 |

EXAMPLES 6-19

The Experimental Procedure set forth above is followed in every material detail employing as the depressant those materials detailed in Table II. The dosage listed in Table II is calculated on solid synthetic depressant and on solid starch. Test results are set forth in Table II as well.

TABLE II

| Example | Reagents % COOH | MWt. | Dose Lb. Solid Reagent/LT | Assays Conc. KCl | Insol. | Distribution Conc. KCl |
|---|---|---|---|---|---|---|
| Comp. B | None | Starch | 0.396 | 91.7 | 1.2 | 74.70 |
| 6 | 45 | 32,000 | 0.052 | 93.5 | 0.8 | 78.48 |
| Comp. C | None | Starch | 0.242 | 86.2 | 1.8 | 68.92 |
| Comp. D | None | Starch | 0.363 | 88.0 | 1.7 | 73.62 |
| 7 | 45 | 32,000 | 0.048 | 88.0 | 2.0 | 71.44 |
| 8 | 45 | 68,000 | 0.047 | 85.6 | 1.8 | 73.68 |
| Comp. E | 45 | 200,000 | 0.041 | 85.3 | 1.7 | 71.38 |
| 9 | 45 | 32,000 | 0.024 | 90.2 | 2.1 | 64.22 |
| 10 | 25 | 68,000 | 0.045 | 87.8 | 3.6 | 71.55 |
| 11 | 45 | 68,000 | 0.047 | 88.4 | 4.7 | 76.40 |
| 12 | 66 | 68,000 | 0.045 | 87.3 | 4.8 | 62.28 |
| 13 | 25 | 32,000 | 0.048 | 89.2 | 5.5 | 73.2 |
| 14 | 66 | 32,000 | 0.050 | 90.6 | 4.0 | 67.58 |
| Comp. F | None | Starch | 0.330 | 90.5 | 2.6 | 70.96 |
| 15 | 45 | 68,000 | 0.043 | 83.8 | 3.6 | 67.75 |
| 16 | 45 | 68,000 | 0.029 | 85.1 | 3.6 | 69.15 |
| 17 | 45 | 68,000 | 0.014 | 89.0 | 3.7 | 66.95 |
| 18 | 45 | 32,000 | 0.044 | 86.5 | 2.8 | 80.65 |
| 19 | 45 | 32,000 | 0.030 | 85.2 | 3.6 | 69.92 |

EXPERIMENTAL PROCEDURE II

Eight hundred parts of sylvinite ore are placed in a flotation cell which is then filled to the lip with a brine solution. The sylvinite is scrubbed for 5 minutes and thereafter transferred to a 5 liter cylinder where it is stirred for 1 minute and allowed to settle for an additional minute. The slimes are decanted to within ½ inch of the settled sylvinite.

The settled sylvinite is combined with 300 parts of saturated brine solution and 0.34 pound per ton of guar is mixed in and then agitated for 10-20 seconds. Next 0.10 pound per ton of an amine collector is mixed in and thereafter agitated for 10 seconds. To this is then added 4 drops of a hydrocarbon oil followed by 5 seconds of agitation and finally 4 drops of methyl isobutyl carbinol followed by 5 seconds of agitation.

The mixture is transferred to a flotation cell and filled to the lip with a brine solution. A two minute float follows. The concentrate and tail are dried and weighed.

EXAMPLES 20-23

The Experimental Procedure II set forth above is followed in every material detail employing a copolymer depressant in the flotation step in place of guar. The dosage listed in Table III is calculated on solid synthetic depressant and on solid guar. Test results are detailed in Table III.

TABLE III

| Example | Reagents % COOH | MWt. | Dose Lb. Solid Reagent/LT | Concentrate % KCl | Insol. | % KCl Recovery |
|---|---|---|---|---|---|---|
| 20 | 45 | 7,000 | 0.105 | 88.50 | 1.22 | 41.0 |
| 21 | 45 | 32,000 | 0.047 | 86.97 | 1.38 | 57.9 |
| 22 | 45 | 68,000 | 0.046 | 86.24 | 1.59 | 58.7 |
| 23 | 45 | 68,000 | 0.023 | 84.08 | 1.76 | 54.7 |
| Comp. G | | Guar | 0.34 | 84.89 | 1.21 | 59.0 |

EXPERIMENTAL PROCEDURE III

The flotation feed consists of 400 parts of coarse and 400 parts of fine sylvinite particles, which have been deslimed. The fine particles slurry is stirred for 10 seconds, followed by the addition of commercial grade of carboxy methyl cellulose (0.056 lb/ton).

A slurry of coarse particle is stirred for 10 seconds, followed by the addition of commercial grade of carboxy methyl cellulose (0.084 lb/ton). After 30 seconds conditioning time, commercial amine (0.275 lb/ton) is added. After stirring for 30 seconds, process oil (0.15 lb/ton) is added and is stirred for 15 seconds at slow speed, followed by 15 seconds high speed stirring.

The fine and coarse fractions are transferred into the flotation bowl and 0.04 lb/ton M.I.B.C. and saturated brine solution are added. The concentrate and tail are filtered and dried (Example H).

EXAMPLES 24-25

The experimental procedure set forth above is followed in every material detail employing a 45% hydrolyzed polyacrylamide (molecular weight 45,000) in the flotation step in place of commercial carboxy methyl cellulose.

The dosage listed in Table IV is calculated as solid synthetic depressant and solid carboxymethyl cellulose and is based on the total charge of coarse and fine combined.

TABLE IV

| | Reagent lb/ton Based on Total Charge of Coarse & Fine | | | | | | Assay Conc. | | Distrib. Conc. |
| | Coarse Particles | | | | Fine Particles | | | | |
| Example | Depressant | Dose | Amine | Oil | MIBC | Depressant | Dose | KCl | Insol. | KCl |
|---|---|---|---|---|---|---|---|---|---|---|
| Comp. H | Carboxy Methyl Cellulose | 0.084 | 0.275 | 0.15 | 0.04 | Carboxy Methyl Cellulose | 0.056 | 89.5 | 1.1 | 86.7 |
| 24 | Synthetic Depressant M.W. 45 K 45% COOH | 0.063 | 0.275 | 0.15 | 0.04 | Synthetic Depressant M.W. 45 K 45% COOH | 0.042 | 91.0 | 1.2 | 85.7 |
| 25 | Synthetic Depressant M.W. 45 K 45% COOH | 0.078 | 0.275 | 0.15 | 0.04 | Synthetic Depressant M.W. 45 K 45% COOH | 0.052 | 91.6 | 1.3 | 87.4 |

What is claimed is:

1. A process for enhancing recovery of sylvite in a sylvinite ore flotation system including an amine collector, said process comprising adding to the flotation system, as a selective depressant, an effective amount of a copolymer or water soluble salts thereof of the general structure:

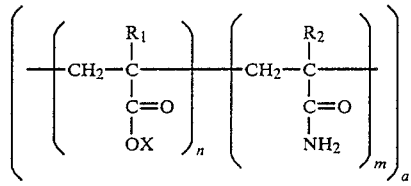

wherein $R_1$ and $R_2$ are individually hydrogen or a methyl radical, X is a hydrogen, alkali metal or ammonium ion, n and m are whole numbers such that the degree of hydrolysis is within the range from about 5% to 66% and n, m and a have numerical value such that the total molecular weight of copolymer is within the range from about 500 to 85,000.

2. The process of claim 1 wherein said synthetic depressant is a 45% hydrolyzed polyacrylamide having a molecular weight on the order of 45,000.

3. The process of claim 1 wherein the effective amount of the active ingredient of synthetic depressant is about 0.01 to 0.20 pound per long ton of sylvinite ore.

4. The process of claim 1 wherein the molecular weight is within the range from 7,000 to 85,000.

5. The process of claim 1 wherein the degree of hydrolysis is within the range from about 20% to 66%.

6. The process of claim 3 wherein the degree of hydrolysis is within the range from about 40% to 45%.

7. The process of claim 1 wherein said depressant is a mixture of a naturally derived depressant and said copolymer or water-soluble salt thereof.

8. The process of claim 5 wherein said naturally derived depressants selected from the group consisting of starch and guar gum.

* * * * *